United States Patent
Jackson et al.

(10) Patent No.: US 10,260,639 B2
(45) Date of Patent: Apr. 16, 2019

(54) ACTUATOR BUSHINGS HAVING INTEGRAL SEALS

(71) Applicant: FISHER CONTROLS INTERNATIONAL LLC, Marshalltown, IA (US)

(72) Inventors: Trenton Frank Jackson, Marshalltown, IA (US); Meredith Jan Bell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 597 days.

(21) Appl. No.: 13/914,080

(22) Filed: Jun. 10, 2013

(65) Prior Publication Data

US 2014/0361207 A1    Dec. 11, 2014

(51) Int. Cl.

| F16K 1/32 | (2006.01) |
| F16C 33/74 | (2006.01) |
| F16J 15/3208 | (2016.01) |
| F16K 31/126 | (2006.01) |
| F16K 5/06 | (2006.01) |
| F16K 5/04 | (2006.01) |
| F16K 1/20 | (2006.01) |
| F16K 1/48 | (2006.01) |
| F16C 29/08 | (2006.01) |

(52) U.S. Cl.
CPC ............... *F16K 1/32* (2013.01); *F16C 33/74* (2013.01); *F16J 15/3208* (2013.01); *F16K 31/1262* (2013.01); *F16C 29/08* (2013.01); *F16K 1/2078* (2013.01); *F16K 1/482* (2013.01); *F16K 5/0485* (2013.01); *F16K 5/0694* (2013.01)

(58) Field of Classification Search
CPC ........ F16K 1/32; F16K 1/2078; F16K 5/0485; F16K 5/0694; F16K 1/482
USPC .................................................. 251/214, 367
See application file for complete search history.

(56) References Cited

U.S. PATENT DOCUMENTS

| 3,039,489 A | * | 6/1962 | Botkin | ........................ 137/883 |
| 3,108,615 A | | 10/1963 | Cripe | |
| 4,171,792 A | * | 10/1979 | Bass | ........................ 251/335.2 |
| 4,351,512 A | * | 9/1982 | Siver | ........................... 251/214 |
| 4,354,666 A | * | 10/1982 | McHale | ..................... 251/335.2 |
| 4,878,677 A | * | 11/1989 | Larkins et al. | ................ 277/511 |
| 5,230,498 A | * | 7/1993 | Wood et al. | ................... 251/214 |

(Continued)

FOREIGN PATENT DOCUMENTS

| EP | 0050949 | 5/1982 |
| EP | 0133296 | 2/1985 |

(Continued)

OTHER PUBLICATIONS

Emerson Process Management, "Fisher 657 and 667 Diaphragm Actuators," Product Bulletin, May 2012, 16 pages.

(Continued)

*Primary Examiner* — Michael R Reid
*Assistant Examiner* — Christopher Ballman
(74) *Attorney, Agent, or Firm* — Hanley, Flight and Zimmerman, LLC

(57) ABSTRACT

Actuator bushings having integral seals are described herein. An example apparatus includes a bushing having a central bore to receive a stem and an annular groove at an end of the bushing. The annular groove surrounds the bore to define a flexible ring to form a seal against the stem.

18 Claims, 4 Drawing Sheets

(56) References Cited

U.S. PATENT DOCUMENTS

| | | | | |
|---|---|---|---|---|
| 5,290,010 | A * | 3/1994 | Ridge | 277/522 |
| 5,503,406 | A * | 4/1996 | Armstrong et al. | 277/522 |
| 5,730,415 | A * | 3/1998 | Gronwick | E03D 3/02 |
| | | | | 251/214 |
| 6,161,838 | A | 12/2000 | Balsells | |
| 6,247,497 | B1 * | 6/2001 | Hirata | F16K 11/0743 |
| | | | | 137/625.43 |
| 6,749,174 | B2 * | 6/2004 | Bircann et al. | 251/129.15 |
| 7,562,859 | B2 * | 7/2009 | Lam | F16K 3/0227 |
| | | | | 251/190 |
| 8,205,890 | B2 * | 6/2012 | Sundararajan | E21B 33/04 |
| | | | | 277/339 |
| 2002/0158221 | A1 * | 10/2002 | Sterud | 251/214 |
| 2003/0015681 | A1 * | 1/2003 | Chatufale | 251/329 |
| 2006/0151729 | A1 * | 7/2006 | Wilson | E03D 3/12 |
| | | | | 251/40 |
| 2007/0246677 | A1 * | 10/2007 | Bircann | 251/214 |
| 2011/0147632 | A1 * | 6/2011 | Brestel | 251/214 |
| 2011/0193001 | A1 * | 8/2011 | Farner | F16K 1/123 |
| | | | | 251/129.15 |
| 2012/0222750 | A1 * | 9/2012 | Wong | F16L 29/007 |
| | | | | 137/14 |

FOREIGN PATENT DOCUMENTS

| | | |
|---|---|---|
| EP | 0438285 | 7/1991 |
| EP | 0805294 | 11/1997 |
| EP | 1890058 | 2/2008 |
| EP | 2513529 | 10/2012 |
| GB | 2192042 | 12/1987 |
| JP | 2009257366 | 11/2009 |
| WO | 2011008898 | 1/2011 |

OTHER PUBLICATIONS

Emerson Process Management, "Fisher 667 Diaphragm Actuator Sizes 30-76 and 87," Instruction Manual, Feb. 2013, 36 pages.
Patent Cooperation Treaty, "International Preliminary Report on Patentability", issued in connection with PCT Application No. PCT/US2014/041640, dated Dec. 15, 2015, 7 pages.
Patent Cooperation Treaty, "International Search Report", issued in connection with PCT Application No. PCT/US2014/041640, dated Sep. 29, 2014, 3 pages.
Patent Cooperation Treaty, "Written Opinion", issued in connection with PCT Application No. PCT/US2014/041640, dated Sep. 29, 2014, 6 pages.

* cited by examiner

ACTUATOR BUSHINGS HAVING INTEGRAL SEALS

FIELD OF THE DISCLOSURE

This patent relates generally to actuators and, more particularly, to actuator bushings having integral seals.

BACKGROUND

Fluid control valves are commonly distributed throughout process control systems to control flow rates and/or pressures of various fluids (e.g. liquids, gases, etc.). A fluid control valve assembly typically includes a valve body, a stem, and an actuator (e.g., a pneumatic actuator) to displace the stem to operate the fluid control valve. Typically, movement of the actuator stem moves the valve stem to position a plug or flow control member within the valve. In the case of a diaphragm actuator, an input pressure is applied to a chamber of the actuator to displace the diaphragm. An actuator stem, which is operatively coupled to the diaphragm, moves with the diaphragm and along a central bore of a bushing. The bushing maintains a seal between the actuator stem and the chamber as the stem slides within the bushing.

SUMMARY

One described example apparatus includes a bushing having a central bore to receive a stem and an annular groove at an end of the bushing. The annular groove surrounds the bore to define a flexible ring to form a seal against the stem.

Another described example apparatus includes a bushing containing an opening to receive a stem, an integral flexible member fixed to one end of the bushing and surrounding the opening, and a groove surrounding the flexible member. The groove is to receive a force to deflect the flexible member toward the stem.

DETAILED DESCRIPTION

Figure 1:
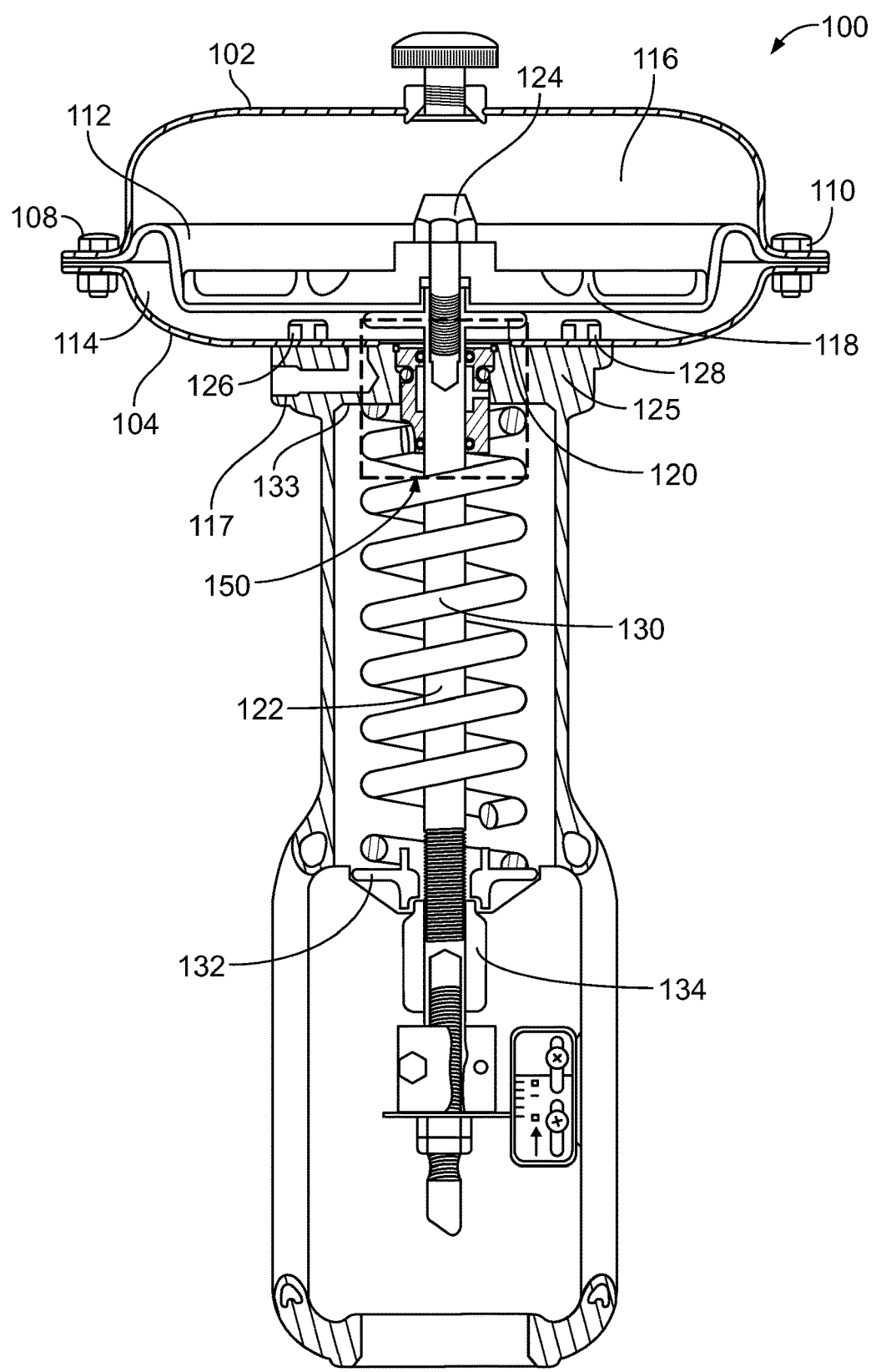
FIG. 1 shows a known diaphragm actuator.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

Many known actuators employ a bushing to guide a stem within the actuator and a separate flexible seal such as an O-ring to provide a seal between the stem and an inner surface of the bushing against which the stem slides. However, when operating in relatively cold environments, O-rings shrink and may become substantially less flexible. As a result, in such cold environments, an O-ring may become less effective at providing a seal. Additionally, O-rings may take a permanent compression set or may be susceptible to material degradation with time in relatively high temperature environments.

The example bushings described herein may be used to guide and seal against stems in diaphragm actuators or any other devices with a sliding stem or shaft. More specifically, the example bushings eliminate the need for a separate seal such as an O-ring or the like, thereby substantially improving the seal against the stem, particularly when operating in relatively cold or high temperature environments. Additionally, a reduction in the number of parts may reduce design complexity and related costs. In some examples, the bushing may be substantially unitary and an end of the bushing may have a groove or channel to form an integral flexible ring-shaped structure surrounding a bore of the bushing. In particular, the groove or channel may define a relatively thin ring-shaped portion of the bushing that may flex in response to pressure (e.g., a fluid pressure controlling an actuator or other device) to cause the flexible ring to engage and seal against the stem with reduced friction compared to an O-ring seal. To enhance the seal provided by the bushing, the flexible ring-shaped structure may be tapered so that an inner surface of the flexible ring-shaped structure makes edge contact against the outer surface of the stem.

In some examples, the groove of the bushing may contain a spring or other bias element to urge the flexible ring-shaped structure into engagement with the stem. Such a spring may be used in addition to or instead of a pressurized fluid to create a sufficient sealing force between the flexible ring-shaped structure and the stem. In some examples, the bushing may additionally include a raised annular portion on an outer surface of the bushing to form a seal against a bore into which the bushing is pressed. For example, the raised annular portion may be integrally formed with the body of the bushing and may be sized to provide an interference fit with the bore (e.g., a bore of an actuator yoke) into which the bushing is to be pressed.

Before describing the example bushings mentioned above, a brief description of a known sealing apparatus is provided below in connection with FIGS. 1 and 2. Turning to FIG. 1, a cross-sectional view of a diaphragm actuator 100 is provided. The actuator 100 includes an upper casing 102 coupled to a lower casing 104 with a plurality of fasteners 108, 110 spaced along an exterior edge of the casings 102 and 104 in a conventional manner. A diaphragm 112 is captured between the casings 102 and 104 and separates the space within the casings 102 and 104 into a control pressure chamber 114 and an atmospheric pressure chamber 116. An inlet 117 supplies pressurized fluid to the control pressure chamber 114. An upper diaphragm plate 118 and a lower diaphragm plate 120 couple the diaphragm 112 to an actuator stem 122 with a fastener 124. A yoke 125 is coupled to the lower casing 104 with a plurality of fasteners 126, 128. A spring 130 is captured between a lower spring seat 132 and an upper spring seat 133. The actuator stem 122 is coupled to the lower spring seat 132 through a spring adjuster 134, and as discussed in greater detail in connection with FIG. 2, is sealed to prevent leakage from the control pressure chamber 114 via a sealing assembly 150.

Figure 2:
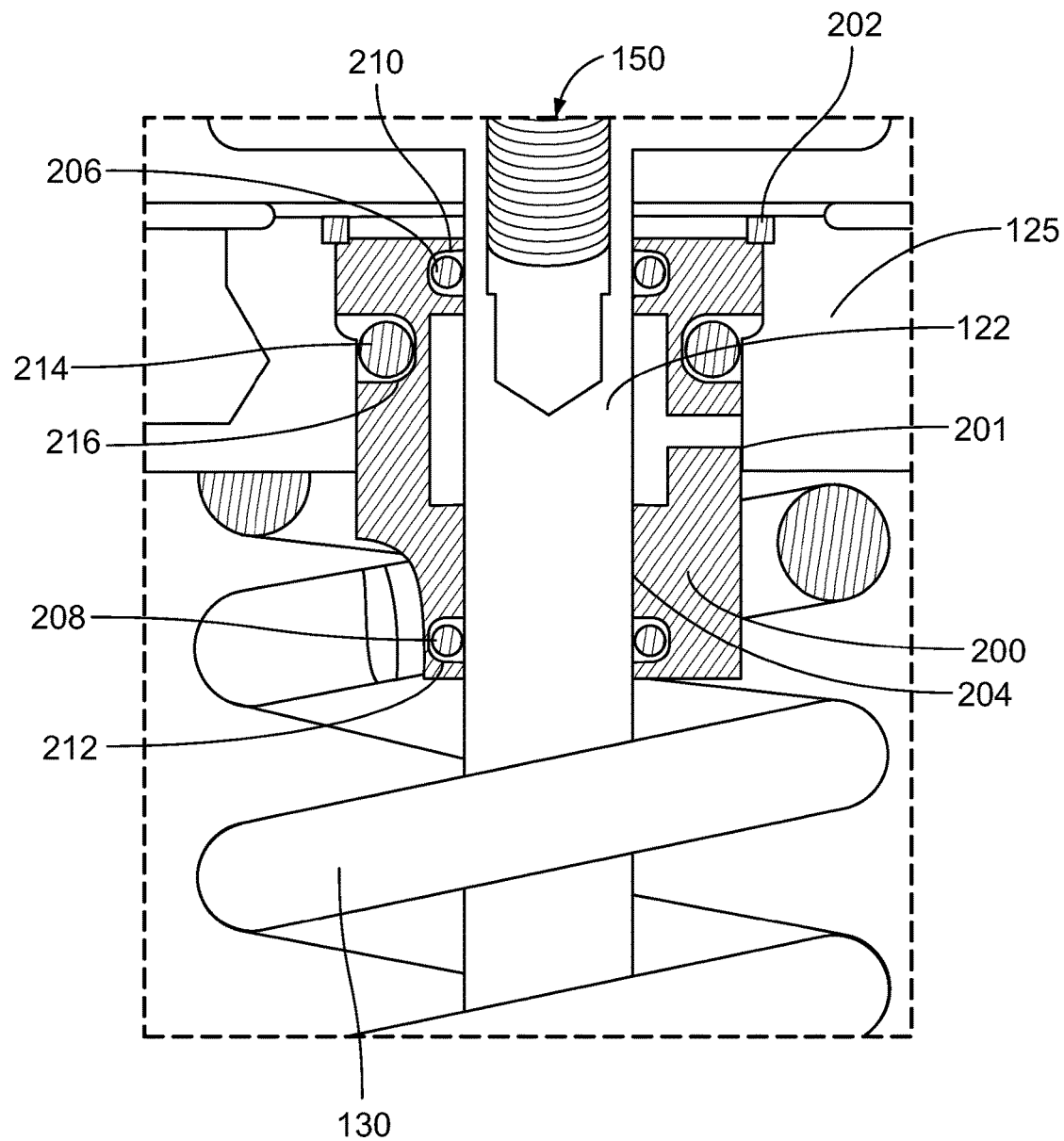
FIG. 2 is an enlarged cross-sectional view of a portion of the known bushing and actuator shaft assembly of FIG. 1.

FIG. 2 is an enlarged cross-sectional view of the sealing assembly 150 of the diaphragm actuator 100 of FIG. 1. As depicted in FIG. 2, a bushing 200 is retained within a bore 201 of the yoke 125 by a snap ring 202. The actuator stem 122 is constrained to slide within a central bore 204 in the bushing 200. As the actuator stem 122 moves along the axis of the central bore 204, lubricated O-rings 206, 208 captured in respective annular recesses 210, 212 of the bushing 200 are compressed and maintain a seal against the actuator stem 122. Additionally, the bushing 200 seals against the yoke 125 by compressing another O-ring 214 captured in another annular recess 216 of the bushing 200.

Figure 3:
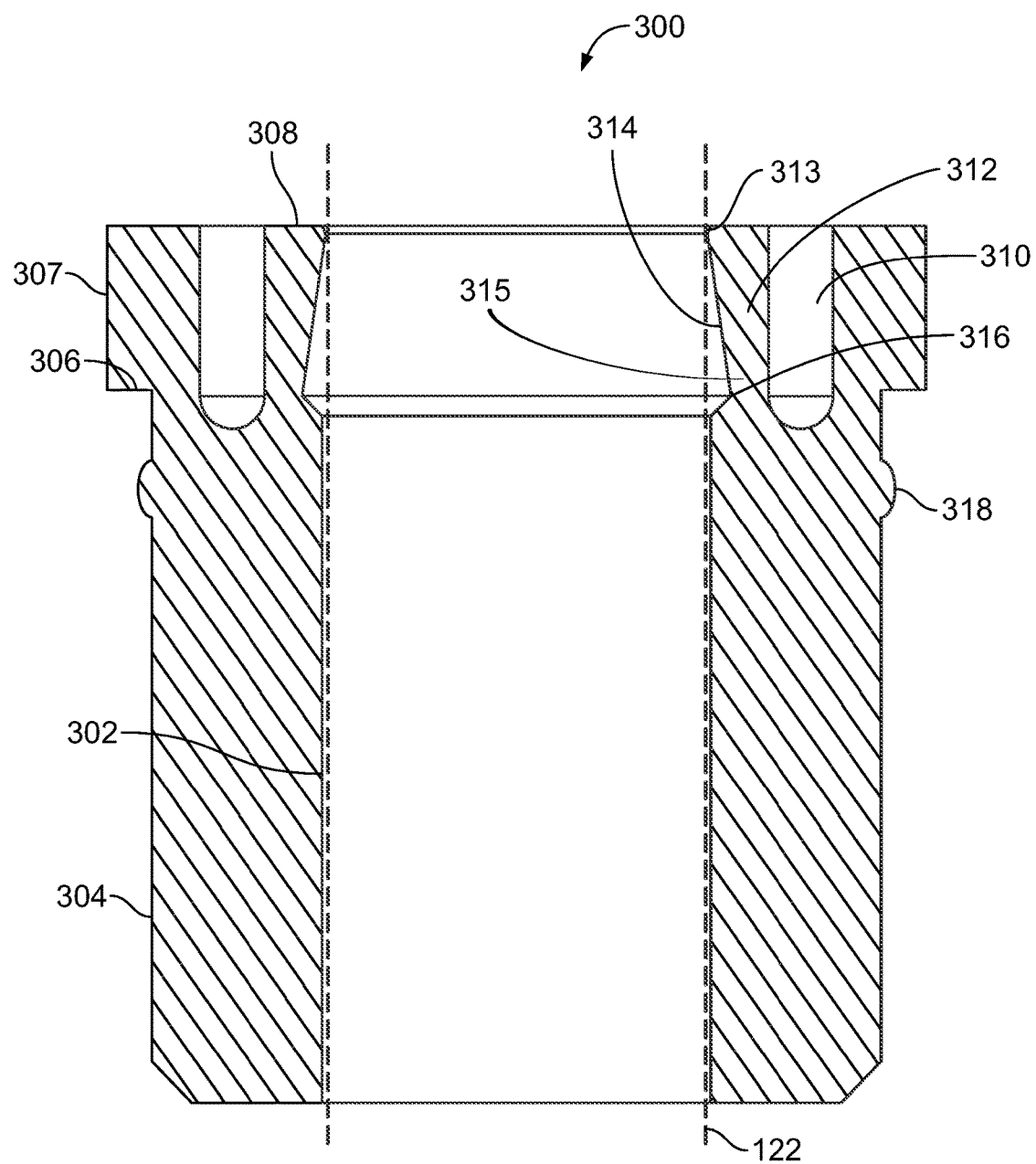
FIG. 3 is a cross-sectional view of an example bushing.

FIG. 3 is a cross-sectional view of an example bushing 300 that eliminates the need to use separate seals such as the O-rings shown in the known sealing assembly 150 depicted in FIGS. 1 and 2. With reference to FIG. 3, the bushing 300 has a central bore 302 to receive the actuator stem 122, which is constrained to slide along the axis of the central bore 302. The bushing 300 is retained in the yoke 125 at surfaces 304, 306 and 307. A top surface 308 of the bushing 300 is stopped by the snap ring 202.

The bushing 300 also includes an annular groove 310 at one end to define a flexible ring 312 to surround the bore 302 and form a seal against the actuator stem 122. The annular groove 310 can accept biasing elements and/or forces such as a pressurized fluid to deflect the flexible ring 312 toward the actuator stem 122. This deflection enables a sealing portion 313, which in this example is integral with the bushing 300, to sealingly engage the actuator stem 122 and thereby substantially eliminate leakage between the bushing 300 and the actuator stem 122. The flexible ring 312 may have a taper 314 as shown in FIG. 3 so that the sealing portion 313 of the flexible ring 312 makes edge contact with the actuator stem 122. The flexible ring 312 may also include a hinge portion 315 and an additional relief 316 to increase the flexibility of the flexible ring 312. In some examples, such as when using a diaphragm actuator, the input pressure applied to the inlet 117 to displace the diaphragm can also be used to simultaneously displace the flexible ring 312 to form (or facilitate the formation of) a seal between the actuator stem 122 and the sealing portion 313 of the flexible ring 312 during operation of the actuator 100.

The bushing 300 also provides a seal against the yoke 125. In one example, a raised annular portion 318 may be provided to seal against the bore 201 of the yolk 125 through an interference fit. In another example, the depth of the annular groove 310 can be increased to place the annular groove 310 in proximity to the annular raised portion 318 to provide additional sealing force when the pressurized fluid or other biasing element is present in the annular groove 310. The bushing 300 may be made of numerous materials including but not limited to metal, plastic, or any other suitable material.

Figure 4:
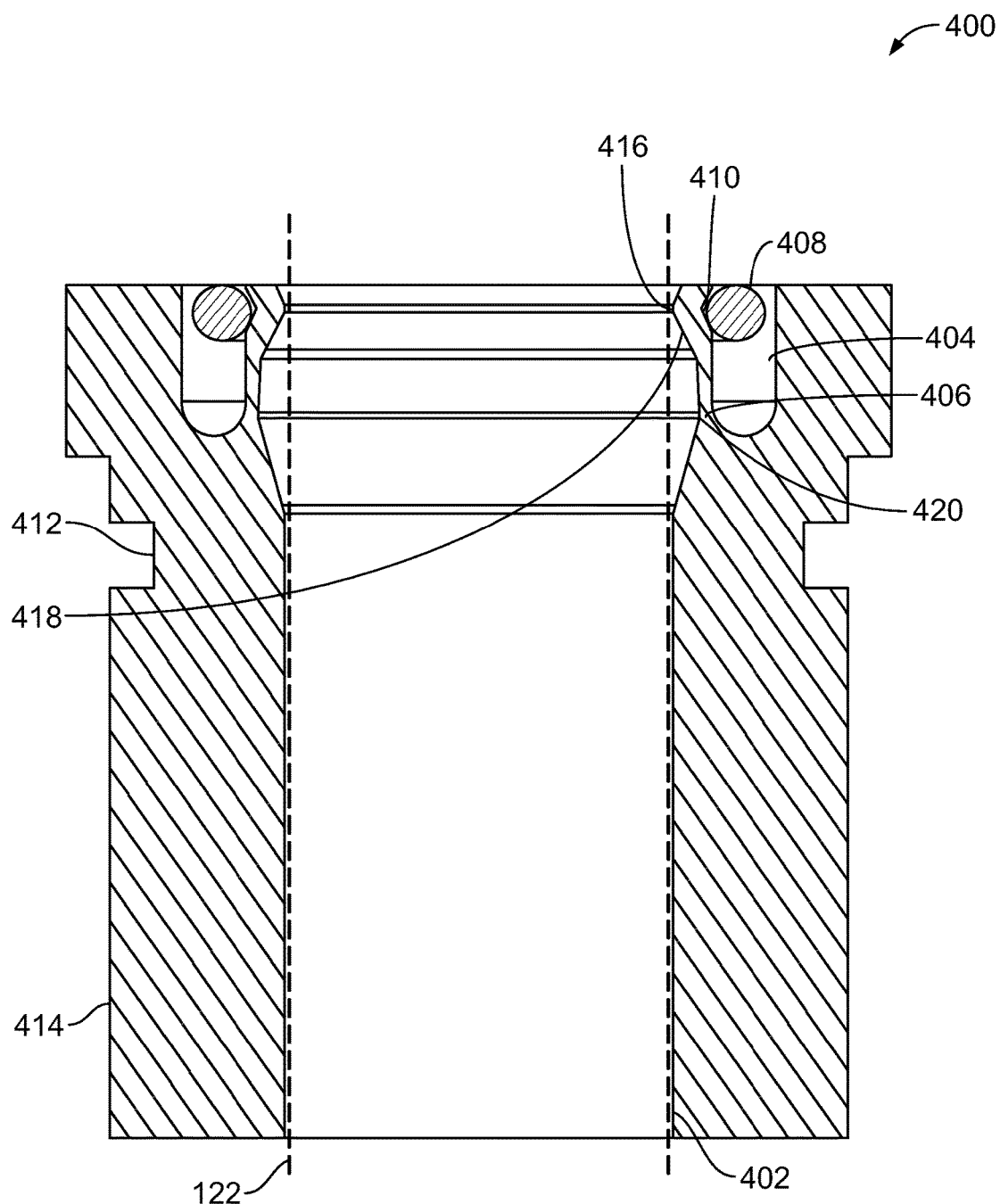
FIG. 4 is a cross-sectional view of another example bushing.

FIG. 4 is a cross-sectional view of another example bushing 400. As depicted in FIG. 4, the bushing 400 has a central bore 402 to receive the actuator stem 122 and an annular groove 404 surrounding the central bore 402 to define a flexible ring 406. The annular groove 404 accepts a spring 408, which is retained in a recess 410. The spring 408 is sized to urge the flexible ring 406 inward against the actuator stem 122 with sufficient force to form a seal between the flexible ring 406 and the actuator stem 122. The spring 408 may be any suitable type of spring including but not limited to a coil spring or a cup-type spring. Alternatively, the spring 408 may be substituted with an O-ring. The example of FIG. 4 depicts an outer annular recess 412 in an outer surface 414 for capturing an O-ring to be between the outer surface 414 and the yoke 125. However, other sealing techniques may be used instead, including the example raised annular portion 318 described in connection with the example bushing 300 of FIG. 3.

As mentioned above, the spring 408 is retained by the recess 410 in the annular groove 404 in a manner that causes the spring 408 to stretch and, therefore, retains the spring 408 in tension. The tension force in the spring 408 displaces the flexible ring 406 towards the actuator stem 122 to urge a sealing portion 416, which in this example is integral with the bushing 400, against the actuator stem 122, thereby substantially eliminating leakage between the bushing 400 and the actuator stem 122 as the actuator stem 122 slides along the central bore 402. In one example, the flexible ring 406 may also have a taper 418 to define the sealing portion 416 to make edge contact with the actuator stem 122. In another example, the flexible ring 406 may also include a relief 420 to increase the flexibility of the flexible ring 406.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
    a bushing having a central bore to receive a stem;
    an annular groove at a longitudinal end of the bushing, the annular groove defining inner and outer radial portions of the bushing at opposite sides of the groove, the inner radial portion surrounding the bore to define an integral flexible ring, the inner radial portion defining at least a portion of an inner diameter of the bushing, the outer radial portion of the bushing defining an outer diameter of the bushing; and
    an axisymmetric recess disposed on-the inner diameter of the bushing, the recess to define a tapered hinge portion disposed on the inner radial portion, the tapered hinge portion to increase a flexibility of the integral flexible ring, wherein the tapered hinge portion is to contact the stem to form a circumferential seal against the stem.

2. The apparatus as defined in claim 1, wherein the annular groove is to receive pressurized fluid.

3. The apparatus as defined in claim 1, wherein the annular groove is to contain a spring.

4. The apparatus as defined in claim 3, wherein the annular groove contains a second recess to retain the spring, the second recess disposed on the inner radial portion.

5. The apparatus as defined in claim 1, further comprising an external surface having a raised annular portion to form a seal against a bore of a yoke.

6. The apparatus as defined in claim 1, wherein the tapered hinge portion is to form an edge contact with the stem.

7. The apparatus as defined in claim 1 wherein the tapered hinge portion is to form a surface contact with the stem.

8. The apparatus as defined in claim 1, wherein the integral flexible ring defines a contact portion having a greater thickness than the tapered hinge portion.

9. The apparatus of claim 1, wherein the tapered hinge portion includes a proximal portion having a first thickness and a distal portion having a second thickness, the first thickness being smaller than the second thickness.

10. An apparatus comprising:
    a bushing containing an opening to receive a stem;
    an integral flexible member fixed to a longitudinal end of the bushing and surrounding the opening;
    a groove surrounding the flexible member, the groove defining inner and outer radial portions of the bushing at opposite sides of the groove, the inner radial portion defining the flexible member and an inner diameter of the flexible member, the outer radial portion defining an outer diameter of the bushing; and a hinge portion of the flexible member, the hinge portion disposed on the inner radial portion, the hinge portion defined by an axisymmetric recess disposed on the inner diameter of the bushing, the hinge portion to increase a flexibility of the flexible member, wherein the hinge portion is to contact the stem to form a circumferential seal against the stem.

11. The apparatus as defined in claim 10, wherein a force to urge the hinge portion is provided by fluid pressure.

12. The apparatus as defined in claim 10, wherein a force to urge the hinge portion is provided by a spring.

13. The apparatus as defined in claim 12, wherein the groove contains a second recess to retain the spring, the second recess disposed on an outer diameter of the inner radial portion.

14. The apparatus as defined in claim 10, further comprising an external surface having a raised annular portion to form a seal against a bore of a yoke.

15. The apparatus as defined in claim 14, wherein the raised annular portion is integrally formed with the bushing.

16. An apparatus comprising:

means for guiding a stem, the means for guiding the stem having integral flexible means for sealing against a surface of the stem, the integral flexible means disposed on a longitudinal end of the means for guiding a stem, wherein the means for guiding the stem defines inner and outer radial portions of the means for guiding the stem, the inner radial portion defining the integral flexible means, the outer radial portion defining an outer surface of the means for guiding the stem; and a hinge portion of the integral flexible means, the hinged portion disposed on the inner radial portion, the hinge portion defined by an axisymmetric taper that is disposed on an inner diameter of the integral flexible means, the axisymmetric taper to increase a flexibility of the integral flexible means, wherein the hinge portion is to contact the stem to form a circumferential seal against the stem.

17. The apparatus as defined in claim 16, wherein the means for sealing comprises means for receiving a force.

18. The apparatus as defined in claim 16, further comprising means for sealing to a yoke.

* * * * *

UNITED STATES PATENT AND TRADEMARK OFFICE
CERTIFICATE OF CORRECTION

PATENT NO. : 10,260,639 B2
APPLICATION NO. : 13/914080
DATED : April 16, 2019
INVENTOR(S) : Jackson et al.

Page 1 of 1

It is certified that error appears in the above-identified patent and that said Letters Patent is hereby corrected as shown below:

In the Claims

Column 4: Claim 1, Line 34, after the word "disposed" replace "on-the" with --on the--

Signed and Sealed this
Twenty-fifth Day of June, 2019

Andrei Iancu
*Director of the United States Patent and Trademark Office*